Nov. 20, 1945.  J. M. COLONY  2,389,486
HOMOGENIZING MACHINE
Filed Feb. 16, 1944
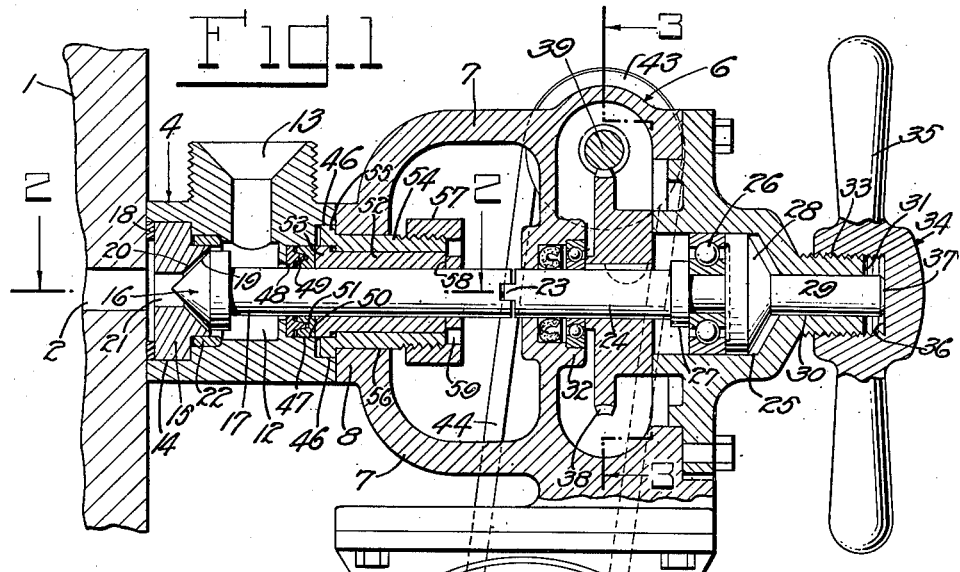
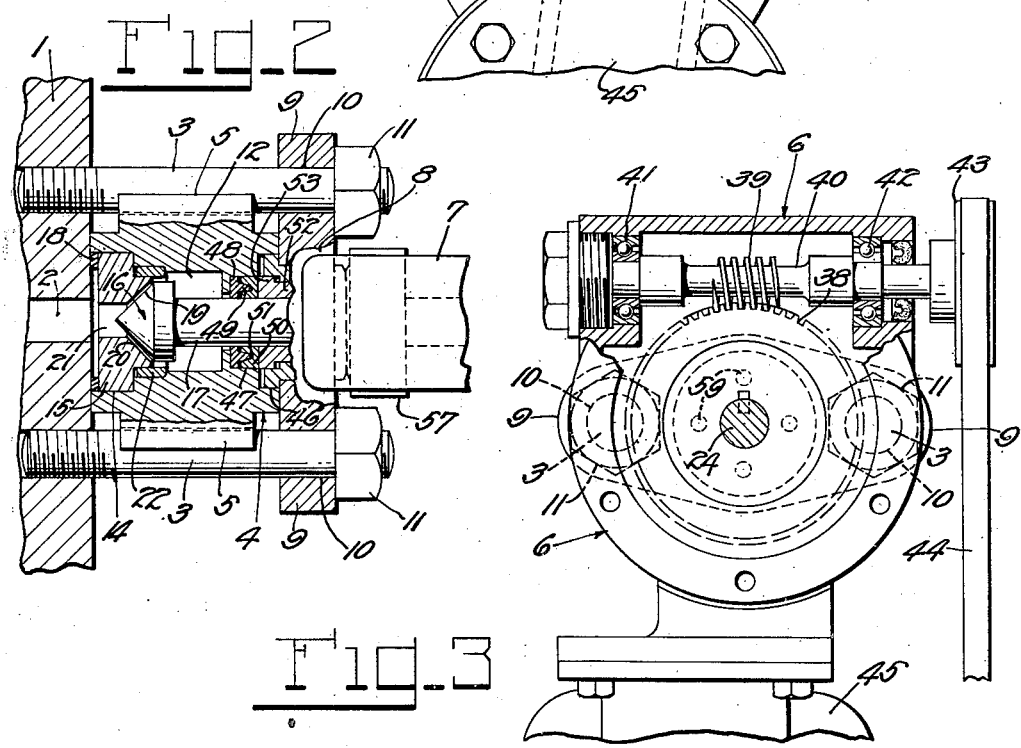
INVENTOR:
John M. Colony
by Dike, Calver & Porter
Attys.

Patented Nov. 20, 1945

2,389,486

UNITED STATES PATENT OFFICE 2,389,486

HOMOGENIZING MACHINE

John M. Colony, West Newton, Mass.; Margaret Wilcox Colony, executrix of said John M. Colony, deceased, assignor to Donald G. Colony, Cambridge, Mass., and John Kenneth Colony, Newton, Mass.

Application February 16, 1944, Serial No. 522,615

3 Claims. (Cl. 259—10)

The present invention relates to an improvement in machines for homogenizing liquids, and particularly for homogenizing milk.

Machines of this character generally have homogenizing assemblies or "valves" made up of two or more members with opposed surfaces which are spaced slightly apart and through which fluids are passed under high pressures. Some of these machines have stationary valves. In such machines, the passage of fluids under high pressure tends to erode the metal of the valves or channel them and thus make them unfit for uniform disintegration of the particles in the fluid. This defect has led to the use of machines with rotating valves. One of the valve members is rotated as the fluids are introduced under pressure so that the fluids do not wear the valve unevenly or form channels in it. This type of machine, however, has proved to be unsatisfactory because it cannot be taken apart and cleaned. The parts that come in contact with fluids cannot readily be removed for cleaning. Such homogenizing machines are generally unsuitable for homogenizing milk because they cannot meet present day sanitary requirements. No one has been able, as far as I am aware, to make a dependable homogenizing machine of the rotating valve type capable of withstanding the high pressures used and yet able to meet sanitary requirements.

My present invention makes it possible to obtain uniform homogenization over a long period of time by using a rotary valve mechanism and yet satisfy the present high standards of sanitation.

The nature of the invention will best be understood from the following description with reference to the accompanying drawing, in which:

Fig. 1 is a side view, partly in section, of a homogenizing machine.

Fig. 2 is a section on the line 2—2 of Fig. 1.

Fig. 3 is an end view of the machine as seen from the right in Fig. 1.

A pressure cylinder 1 having an orifice 2 is provided with bolts 3, 3 on opposite sides of the orifice. A valve casing 4 having flanges 5, 5 is slidably mounted on the bolts 3, 3. A housing 6 is connected by arms 7 to a hub 8 provided with flanges 9, 9 adapted to receive the bolts 3, 3 in holes 10, and when the hub 8 is in place with the flanges 9 resting on the bolts and the hub is drawn toward the cylinder 1 by nuts 11, 11 the casing 4 is squeezed between the cylinder and the hub and held tightly in operative position. When the nuts 11, 11 are removed and the housing withdrawn, the valve casing may easily be pulled longitudinally of the bolts and removed.

A passage 12 formed in the valve casing is adapted to communicate with the orifice 2. The opposite end of the passage leads to a threaded outlet 13. The part of the passage 12 that communicates with the orifice 2 is enlarged to form a recess 14 adapted to hold one member 15 of a homogenizing valve. A second valve member 16 is secured to a shaft 17 rotatably journalled in the hub 8. A packing ring 18 prevents fluid from leaking between the valve casing and the cylinder.

The homogenizing surfaces of the valves may be either flat or conical. In the preferred form shown, however, the valve member 16 has a convex conical surface 19 and valve member 15 has a concave frusto-conical surface 20 adapted to fit closely over the surface 19. A bore 21 through the axis of the member 15 permits the passage of fluids from the recess 14 to the space between the surfaces 19 and 20. An impact ring 22 is placed about the inner edge of the valve member 15 in position to receive the stream of fluid after it passes between the valve members.

The end of the shaft 17 is joined, as by a tongue and groove connection 23 or similar keyed joint, to a second shaft 24. The connection 23 enables the two shafts to be rotated together, but allows them to be separated by longitudinal movement. The second shaft extends into a box 25 where it is journalled in a thrust bearing 26 held in place by a collar 27 on the shaft and the head 28 of a pin 29 which extends through a bore 30 in the head 31 of the housing 6. A second bearing 32 holds the shaft in alinement. The head 31 has external screw threads 33, and an adjusting nut 34 having a handle 35 is screwed over the threads so that the seat 36 of the nut is brought into contact with the end 37 of the pin 29. Clockwise rotation of the nut 34 causes the pin 29 to be pushed inwardly against the bearing 26 which in turn pushes the shafts 24 and 17 axially to bring the valve member 16 closer to the valve seat 15. The nut 33 thus serves to adjust the relative position of the valves and regulate the space between them.

Mechanism for rotating the valve member 16 includes a gear 38 carried by the shaft 24 which meshes with a worm gear 39 on a shaft 40 journalled in bearings 41 and 42. The end of the shaft 40 has a pulley 43 driven by a belt 44 from a motor 45 secured by suitable means to the housing 6.

The casing 4 has an annular outer recess 46 and an annular inner recess 47 formed in the wall toward the hub 8. A packing ring 48 with an annular ridge 49 is seated in the inner recess and a second ring 50 having a groove 51 matching the ridge 49, but slightly smaller, is placed next to the ring 48. The bearing for the shaft 17 comprises a sleeve 52 with a head 53. The head 53 is placed next to the ring 50, and the sleeve portion 52 extends along the shaft 17 to a point within the hub 8. A second sleeve 54 having a head 55 is placed over the sleeve 52. The head 55 is too large to pass through the opening 56 of the hub 8, while the body of the sleeve 54 passes through the opening and into the hub. The inner end of this sleeve is screw threaded, and a nut 57 is screwed over the threads until the seat 58 of the nut touches the end of the inner sleeve 52, which extends farther into the hub than the sleeve 54. Holes 59 in the nut may be used to allow tightening by certain well-known types of wrenches. Tightening causes the inner sleeve 52 to be pushed against the ring 50 to compress the packing and spread it over the ridge 49 of the ring 48, thus making a tighter connection. This arrangement prevents fluids from escaping from the valve casing into the hub.

The connecting arms 7 are sufficiently resilient to allow a slight displacement of the rotatable valve member under certain conditions. The fluid is sometimes pumped from the pressure cylinder with varying pressures, as, for example, when a triplex pump is used. In such cases the flow against the valves is not uniform, so that if the valves were rigidly held in fixed relationship the uneven flow would tend to vary the pressure. The spring or flexibility permitted by the connecting arms 7 is sufficient to allow this adjustment. This form of adjustment cannot be equally well obtained by employing a spring that normally tends to urge the shafts and the valve head in the direction of the valve seat, however, because such constant pressure would often cause undue wear on these parts.

After an homogenizing operation has been completed, all of the mechanism coming in contact with the fluid may easily be taken apart for cleaning. To accomplish this the nuts 11 are removed and the housing 6 is removed from the bolts 3. The valve member 16 is held by the valve casing 4, so that removal of the housing causes the shaft 17 to separate from the shaft 24, which remains within the housing. Then the valve casing 4 is pulled longitudinally of the bolts 3 and removed. This exposes the valve member 15 so that it may readily be removed and cleaned. When it has been removed, the member 16 may be slid through the aperture and taken out of the casing. The passage 12 is then clear of the homogenizing elements and may be flushed out. When the casing 4 and housing 6 are separated for cleaning purposes the tightening nut 57 and the various sleeves and packing rings may all be removed and cleaned. In this manner every part of the mechanism brought into contact with the fluid may be cleaned quickly and easily, and by persons having no particular skill in handling mechanical instruments.

I claim:

1. In a machine for homogenizing fluids, in combination, a housing, means by which the housing is held to a pressure cylinder, a valve casing removably held intermediate the housing and the cylinder, removable homogenizing members in the casing, a removable shaft by which one of the homogenizing members is rotated extending from the casing into the housing, a second shaft keyed to the first shaft, means by which the shafts are rotated, means by which the shafts are moved axially to adjust the relative positions of the homogenizing members, and adjustable packing members removably held in the adjoining walls of the valve casing and the housing by which escape of fluids along the removable shaft is prevented.

2. In a device for homogenizing liquids, in combination, a housing having a hub adapted to be removably secured to a pressure cylinder, a casing held between the hub and the cylinder, homogenizing members removably held within the casing, a shaft for turning one of said members, means associated with the housing for turning the shaft, and resilient members connecting the housing to the hub by which the shaft is allowed a slight longitudinal movement in response to increased pressure by the liquid on the rotatable homogenizing member.

3. In a device for homogenizing liquids, in combination, a housing, a hub on the housing, resilient members connecting the hub and the housing, a casing adapted to be held tightly against the hub during operation, a recess formed in the side of the casing opposite the hub, a removable homogenizing member in the recess, a rotatable homogenizing member having a working surface adapted to cooperate with a complementary surface on the first homogenizing member, an impact ring removably held about the homogenizing members opposite the complementary surfaces thereof, a shaft for turning one of said homogenizing members, and means for moving the shaft axially to control the distance between said members.

JOHN M. COLONY.